2,794,021
Patented May 28, 1957

2,794,021

PROCESS FOR MAKING ORGANIC POLYSULFIDES

Lester A. Brooks, Norwalk, Conn., assignor to R. T. Vanderbilt Company, Inc., New York, N. Y., a corporation of New York No Drawing. Application March 27, 1953,
Serial No. 345,229

6 Claims. (Cl. 260—293.4)

My invention relates to a process for the production of certain thiuram polysulfides.

The art is aware of methods for the preparation of thiuram polysulfides. For example, it is known in the art to prepare piperidyl thiuram polysulfides by reacting the sodium salt of piperidyl dithiocarbamic acid with a sulfur chloride. The use of a sulfur chloride is objectionable, however, in that sulfur chlorides are difficult to handle, causing corrosion and necessitating the use of special equipment for carrying out the reaction.

In accordance with my present invention, I have devised a process whereby piperidyl thiuram polysulfides and related materials can be prepared efficiently and without the use of a sulfur chloride and also without the disadvantages which result from such use. Thus, I have discovered that thiuram polysulfides of the formula:

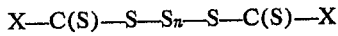

can be prepared by an operation involving simply heating $n$ moles of elemental sulfur and one mole of a compound of the formula:

X—C(S)—S—S—C(S)—X

X being a N-morpholyl, N-piperidyl or lower alkylated N-piperidyl radical and $n$ being from 2 to 6.

The following examples illustrate in detail certain embodiments which fall within the scope of my invention.

Example I

Into a one liter beaker containing 600 ml. of boiling water there is placed an intimate blend composed of 100 grams of piperidyl thiuram disulfide and 50 grams of elemental sulfur. The mixture is agitated, and the blend melts and forms a brown oil which drops to the bottom of the beaker. Upon continued boiling, the brown oil gradually lightens in color, turns pasty and then eventually forms into a hard solid. This requires approximately 5 to 10 minutes when the initial blend of piperidyl thiuram disulfide and elemental sulfur is uniform. Upon cooling, the water is decanted and the desired product formed underneath the water layer is removed. The product is then crushed, suspended in water again, and the mixture boiled for another 30 to 60 minutes to complete the reaction, when necessary. Upon filtering, washing, drying and grinding, the product is a very light yellow-gray solid which melts above 114° C., generally at 118–122° C.

Example II 20 grams of piperidyl thiuram disulfide and 10 grams of elemental sulfur are dissolved in 250 grams of toluene. The solution is then refluxed for 2 hours. After cooling and evaporation of the toluene, there is obtained 30 grams of an orange-yellow product which melts at 119–123° C. This product is not a mechanical mixture, as proved by the fact that the melting point of a mechanical mixture of the disulfide and elemental sulfur is 90–95° C. A study of the melting points of the combination of the disulfide and elemental sulfur shows a steady increase with the time of reflux, the temperature of 119–123° C. representing the maximum increase for the relative proportions of disulfide and elemental sulfur taken. The composition of the product produced can be designated as follows:

X being N-piperidyl and $n$ being 5.

My invention is generally applicable to the preparation of thiuram polysulfides of the formula:

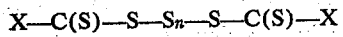

in which X is a N-morpholyl, N-piperidyl or a lower alkyl homologue of N-piperidyl and $n$ is from 2 to 6. Thus, X can be, for example, 2-methylpiperidyl, 3-methylpiperidyl, 3-ethylpiperidyl, 2,6-dimethylpiperidyl, 3-ethyl-6-methylpiperidyl and the like, so that in place of the piperidyl thiuram disulfide used as a starting material in the specific examples there can be substituted an equivalent amount of morpholyl thiuram disulfide, 2-methylpiperidyl thiuram disulfide, 3-methylpiperidyl thiuram disulfide, and the like. From 2 to 6 moles of elemental sulfur is reacted with one mole of the thiuram disulfide taken as a starting material.

The temperature used in carrying out the reaction between the disulfide and elemental sulfur can be varied widely, but generally I prefer to use temperatures within the range from about 80° C. to about 140° C. Where water, rather than an organic solvent, is used for the purpose of carrying out the reaction, I prefer to use a reaction temperature of from about 80° C. to about 110° C., elevated pressures being utilized when necessary to maintain the water in liquid phase. When water is used, I prefer to add the disulfide and elemental sulfur to the heated water in the form of an intimate blend, since this facilitates the reaction. If desired, a small amount of a wetting agent, such as Ethofat 242/25 (a proprietary non-ionic surface active agent prepared by reacting fractionated and distilled fatty acids with ethylene oxide, the alkyl chains being substantially in the following weight percents: oleic, 15; linoleic, 15; and rosin acids, 70) or Triton X–100 (a proprietary nonionic surface active agent being an alkyl aryl polyether alcohol) can be included in the water in order to facilitate the reaction. When this is done, the wetting agent can be used in the amount of one-half to one percent, based upon the weight of the water. Agitation can also be used in order to aid in carrying out the reaction. Where an organic solvent is used, rather than water, xylene or ethylbenzene can be used in place of the toluene employed in Example II.

I claim:

1. A method for the manufacture of polysulfides of the formula:

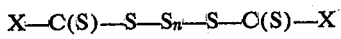

which comprises heating $n$ moles of elemental sulfur and one mole of a compound of the formula:

X being a radical selected from the group consisting of N-morpholyl, N-piperidyl, and lower alkylated derivatives of N-piperidyl, and $n$ being from 2 to 6 while said sulfur and said compound are dispersed in a liquid medium.

2. A process according to claim 1 in which X is N-piperidyl and $n$ is 5.

3. A method for the manufacture of polysulfides of the formula:

which comprises heating an aqueous mixture of $n$ moles of elemental sulfur and one mole of a compound of the formula:

$$X—C(S)—S—S—C(S)—X$$

at a temperature within the range from about 80° C. to about 110° C., X being a radical selected from the group consisting of N-morpholyl, N-piperidyl, and lower alkylated derivatives of N-piperidyl, and $n$ being from 2 to 6.

4. A process according to claim 3 in which X is N-piperidyl and $n$ is 5.

5. A method for the manufacture of polysulfides of the formula:

$$X—C(S)—S—S_n—S—C(S)—X$$

which comprises heating at a temperature within the range from about 80° C. to about 140° C. $n$ moles of elemental sulfur and one mole of a compound of the formula:

$$X—C(S)—S—S—C(S)—X$$

in solution in at least one solvent selected from the group consisting of toluene, xylene and ethylbenzene, X being a radical selected from the group consisting of N-morpholyl, N-piperidyl, and lower alkylated derivatives of N-piperidyl, and $n$ being from 2 to 6.

6. A process according to claim 5 in which X is N-piperidyl, $n$ is 5 and said solvent is toluene.

References Cited in the file of this patent
UNITED STATES PATENTS

| | | |
|---|---|---|
| 1,681,717 | Whitby | Aug. 21, 1928 |
| 1,780,545 | Whitby | Nov. 4, 1930 |
| 1,782,111 | Adams | Nov. 18, 1930 |
| 1,798,588 | Cambron | Mar. 31, 1931 |
| 1,867,982 | Naunton et al. | July 19, 1932 |
| 2,014,353 | Cramer | Sept. 10, 1935 |
| 2,251,686 | Musselman | Aug. 5, 1941 |
| 2,351,657 | Bayes | June 20, 1944 |

OTHER REFERENCES

Craig et al.: Chem. Abstracts, vol. 46, col. 1794 (1952).